United States Patent [19]

Gallup

[11] Patent Number: 5,024,769

[45] Date of Patent: Jun. 18, 1991

[54] METHOD OF TREATING AN ARSENIC-CONTAINING SOLUTION

[75] Inventor: Darrell L. Gallup, Chino, Calif.

[73] Assignee: Union Oil Company of California, Los Angeles, Calif.

[21] Appl. No.: 473,226

[22] Filed: Jan. 31, 1990

Related U.S. Application Data

[63] Continuation-in-part of Ser. No. 345,177, May 1, 1989, and Ser. No. 226,039, Jul. 29, 1988.

[51] Int. Cl.$^5$ ............................. C02F 1/76; C02F 1/58
[52] U.S. Cl. ..................................... 210/721; 210/727; 210/728; 210/754; 210/763; 210/764; 210/911; 210/916
[58] Field of Search ............... 210/755, 753, 754, 758, 210/764, 747, 912, 721, 763, 916, 911, 728, 727; 423/87; 204/105 R

[56] References Cited

U.S. PATENT DOCUMENTS

| | | | |
|---|---|---|---|
| 3,136,598 | 6/1964 | Kokurudz | 210/755 |
| 3,342,674 | 9/1967 | Kowalski et al. | 210/755 |
| 4,201,667 | 5/1980 | Liao | 210/721 |
| 4,297,224 | 10/1981 | Marchiarolo et al. | 210/755 |
| 4,465,598 | 8/1984 | Darlington et al. | 210/912 |
| 4,637,865 | 1/1987 | Sergent et al. | 204/105 R |
| 4,710,305 | 12/1987 | Allison et al. | 210/747 |
| 4,763,479 | 8/1988 | Hoyer et al. | 210/747 |

FOREIGN PATENT DOCUMENTS 164639  9/1984  Japan ........................... 423/87

Primary Examiner—Stanley Silverman
Assistant Examiner—Neil M. McCarthy
Attorney, Agent, or Firm—Clark E. De Larvin; Gregory F. Wirzbicki

[57] ABSTRACT

A method is provided for oxidizing arsenic in an arsenic-containing solution. The method comprises contacting the solution containing arsenic in a +3 oxidation state with an amount of a specific type of oxidizing agent, i.e., an agent containing at least one

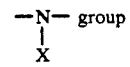

wherein X is a halogen to effect substantially complete oxidation of the arsenic to the +5 oxidation state. The amount of oxidizing agent used is substantially less than that which would theoretically be required. In accordance with a particularly preferred embodiment, the oxidized arsenic is reacted with a metal to form a substantially water-insoluble precipitate, preferably an iron or calcium arsenate.

50 Claims, No Drawings

METHOD OF TREATING AN ARSENIC-CONTAINING SOLUTION

RELATED APPLICATIONS

This application is a continuation-in-part of copending U.S. patent application Ser. Nos. 345,177 filed May 1, 1989 and 226,039 filed July 29, 1988.

BACKGROUND OF THE INVENTION

1. Field of the Invention

The present invention relates generally to a method of treating an arsenic-containing solution. It particularly relates to the treatment of an arsenic-containing brine in an open cooling tower and the like, in which a condensate of steam, derived from an arsenic-containing geothermal brine, is cooled.

2. Background Discussion

There are many sources of an aqueous arsenic-containing stream containing arsenic in a +3 oxidation state and for which there is a need to convert the arsenic to a higher oxidation state; for example, to convert arsenious acid to arsenic acid. The reason for converting the arsenic from a lower to a higher oxidation state is that the latter is far more reactive and, thus, more readily precipitated from the stream by reaction with a metal such as calcium or ferric iron to form a substantially water-insoluble, stable, calcium arsenate or ferric arsenate, respectively. Arsenic-containing fluids of interest are aqueous geothermal fluids. Of particular interest are the geothermal brines used for the production of electric power.

General processes by which geothermal brines can be used to generate electric power are well known. In a typical process, a geothermal brine at an elevated temperature and pressure is introduced into a zone of reduced pressure (flashed) to convert some of the brine into steam. The steam so produced is then used to drive a conventional steam turbine-generator combination to produce electricity. Generally, the remaining brine from the first reduced pressure zone will be introduced into one or more additional zones of further reduced pressure for the production of additional steam. Ultimately, the steam is condensed, recombined with any remaining brine and reinjected into a deep well for disposal.

Reinjection of the geothermal brine into an adjacent well is important to avoid the problems associated with the transport and disposal of the large amounts of saline and usually highly-contaminated liquid involved. Frequently, the brine contains small amounts of arsenic in the +3 oxidation state, most often present as arsenious acid. Arsenic in its +3 oxidation state is both water-soluble and highly toxic. Accordingly, any waste containing it must be disposed of in a hazardous waste disposal site. Obviously, the cost associated with disposal in a hazardous waste site is substantially greater than the cost for normal waste disposal.

One source of waste is the cooling tower and associated catch basin which are used to cool the steam. More particularly, a sludge forms in the cooling tower and the catch basin. The sludge comprises a mixture of living organisms, dust particles, precipitated salt from the brine and some entrained steam condensate. Many types of airborne organisms are known to grow at a very rapid rate in the hot, wet environment of the cooling tower and condensate catch basin. Such organisms include bacteria, algae, fungi and the like. While it is possible to control the growth of such living organisms, a significant amount of sludge will still form over an extended period of time. The sludge so formed must be periodically removed for disposal to prevent its interfering with the operation of the brine handling system. Since the sludge contains arsenic-containing condensate some treatment is required to permit disposal in a nonhazardous waste site.

Another problem associated with the use of a geothermal brine for generating electric power is that it is not always possible to reinject all of the brine into an adjacent well. For example, in some locations reinjection of all or even a significant portion of the brine produces a reduction in the temperature of the source brine. Another situation which can arise is that the reinjection well will not penetrate a subterranean formation having sufficient permeability to accept the brine at the same flow rate at which it is being processed. When reinjection of the brine is not possible, disposal of all or any substantial portion of the brine in a hazardous waste site would be prohibited by the cost. As an illustration, the production of only about 10 megawatts of electric power requires a continuous flow of over a millions pounds per hour of geothermal brine. When such large quantities of brine cannot be reinjected into a well, treatment to permit their disposal in a nonhazardous waste site is essential.

It is known that arsenic in its higher oxidation state is less toxic, for example, arsenic acid is less toxic than arsenious acid. It also is known that the higher oxidation state is more reactive and will react with, for example, iron and calcium to form stable, water-insoluble iron arsenate and calcium arsenate, respectively. A problem arises in that the materials taught by the prior art for the oxidation of arsenic require that at least a stoichiometric amount be used, and generally a slight excess is required to ensure substantially complete oxidation of all of the arsenic. In the case of geothermal brines, in addition to the arsenic, there also are many other ions which accept the oxygen as readily as arsenic and, since the oxidizers are not selective, they also will be oxidized. The net result is that a substantial amount of oxidizer is required. Clearly there is a need for a method of treating an aqueous solution containing arsenic in a +3 oxidation state to oxidize it to a +5 oxidation state without the necessity of using stoichiometric quantities of an expensive oxidizer.

SUMMARY OF THE INVENTION

The present invention provides an effective and economical method for treating an aqueous solution containing arsenic in a +3 oxidation state to oxidize the arsenic to a +5 oxidation state. The invention is particularly useful for the treatment of a waste stream, such as a brine or brine-derived condensate, wherein the arsenic is present in its +3 oxidation state along with other oxidizable species, and it is imperative that the arsenic be converted to a water-insoluble compound prior to disposal of the waste stream. In accordance with the invention, the aqueous arsenic-containing solution is contacted with a specific oxidizing agent, which is most usually an oxidizing biocide, in an amount sufficient to convert substantially all of the +3 arsenic to a +5 oxidation state.

It has been found that the amount of oxidizing agent required to oxidize the arsenic and other oxidizable species is very small compared to the stoichiometric amount which theoretically would be required. Apparently, some catalytic effect is involved which causes the desired oxidation of the arsenic and other species. Typically, less than about 10 percent and more generally, less than even about 1 percent of the stoichiometric amount of oxidizing biocide is needed to effect substantially complete oxidation of the arsenic and other oxidizable species. In the case of geothermal brines, amounts within the range of from about 0.01% to about 10.0% and preferably within the range from about 0.2% to 2.0% of the stoichiometric amount have been found to be highly effective. The amount of oxidizing agent utilized is so small that it is substantially ineffective as a biocide. Thus, the oxidizing agent does not control, slow the growth or even substantially inhibit the growth of living organisms. Where such control is desired an additional biocide treatment is required.

Once the arsenic has been oxidized to the +5 oxidation state (arsenic acid) it is readily reacted to form a substantially water-insoluble compound. In addition, the compound so formed is substantially less toxic. The preferred reactants for arsenic acid are aluminum, iron and calcium which readily form stable, water-insoluble alumina, iron and calcium arsenate, respectively.

The oxidizing agents suitable for use in the present invention contain at least one

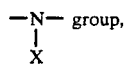 group, wherein X is a halogen.

A particularly preferred agent is selected from the group consisting of trichloro-isocyanuric acid and salts thereof, 1-bromo-3-chloro-5,5-dimethyl-hydantoin and salts thereof, and other halogenated substituted hydantoins, and mixtures thereof. The most preferred agent, on the basis of availability, cost and effectiveness, is trichloro-isocyanuric acid.

DESCRIPTION OF THE PREFERRED EMBODIMENT

For convenience, the present invention will be described with respect to a particularly preferred application, namely, for a system in which a geothermal brine is used to generate electrical power and in which the geothermal brine utilized contains arsenic, typically as arsenious acid. The brine may also contain significant quantities of other oxidizable species including, among others, $H_2S$, NO and their precursors. In such a system, brine from a geothermal well is first introduced into a zone of reduced pressure (flashed) to produce two phases, a gas phase and a liquid phase. The gas phase principally comprises steam along with a minor amount of non-condensible gases, both of which are passed through a steam turbine which drives a generator to produce electric power. The effluent steam from the turbine is introduced into a condenser, in which at least some of the steam is condensed to form a condensate and from which the non-condensible gases are discharged. The condensate is circulated through at least one open cooling tower. Generally the cooling tower will have associated therewith a condensate catch basin. The liquid phase, referred to as the rejected brine, may be passed through one or more additional zones of reduced pressure to produce additional steam. Under ideal circumstances, the condensate, and the rejected brine ultimately are disposed of by reinjection into a well.

During operation of the system a sludge is formed in the cooling tower and catch basin. The sludge is the result of entrainment of air borne dust particles and air borne living organisms, the latter of which grow very rapidly in the hot, wet environment of the cooling tower and condensate catch basin. The sludge so formed also contains entrained steam condensate along with the various elements dissolved therein, including arsenic which is generally present as arsenious acid. For a more detailed description of geothermal brine processing and brine constituents, see, for example, Recovery of Precious Metals from Aqueous Media, U.S. Ser. No. 07/345,167, filed May 1, 1989 assigned to the assignee of the present invention.

In accordance with the present invention, the arsenic-containing brine, condensate sludge or combinations thereof is treated with a small amount of a selected oxidizing agent.

The oxidizing agents suitable for use in the present invention are characterized by having at least one

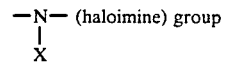 (haloimine) group wherein X is a halogen. Preferred agents have an

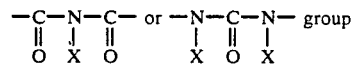

and the even more preferred agents have a

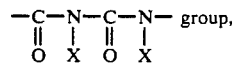 group, wherein in each instance X is a halogen. The preferred halogens are chlorine, bromine and combinations thereof. It will be noted that in the particularly preferred agents no two haloimine groups are bonded to one another.

Generally, the oxidizing agents are organic compounds containing the above-described haloimine or haloimine-carbonyl functionality and at least about 3, generally about 3 to about 20, and preferably 3 to about 15 atoms other than hydrogen, i.e., carbon, heteroatoms such as S, O, N, etc., and pendant functional groups, e.g., oxy, thioxy, amino, thiol groups and/or organic radicals.

The preferred oxidizing agents of the present invention are characterized by a heterocyclic ring structure comprising carbon and nitrogen atoms. Affixed to the ring structure is at least one and preferably two or more halogen atoms. Thus, the oxidizing agents of the present invention may be described as halogenated-organic, oxidizing biocides or more specifically, as halogenated-heterocyclic, organic, oxidizing biocides.

The most preferred oxidizing agent for use in accordance with the present invention comprises a ring structure and may be characterized by the following general formula:

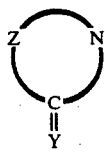

wherein X is a halogen, Y is oxygen or sulfur and Z is a divalent radical of from 3 to 10, preferably 3 to 8, more preferably 3 to 4 atoms in length, forming the ring structure. The ring structure preferably consists of alternate nitrogen and carbon atoms. Typical ring structures are triazine and oxidiazole. Typically, each nitrogen atom of the ring structure is substituted with a halogen. The carbon atoms are generally substituted with one or more members of the group consisting of hydrogen, oxygen, chlorine, bromine and $C_1$ to $C_6$ organic radicals. The preferred halogens, based upon their availability, are chlorine and bromine. A noteworthy aspect of the ring structures of the preferred oxidizing agents are that they include oxycarbonyls adjacent each side of at least one of the halogen-substituted nitrogen atoms. The preferred agents further include a halogen-substituted nitrogen atom adjacent each side of at least one of the oxycarbonyls. Two preferred agents have the following chemical structure:

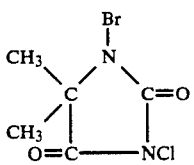

1-bromo-3-chloro-5, 5-dimethyl-hydantoin

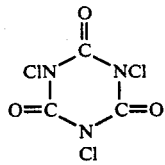

trichloroisocyanuric acid

It is readily seen that these two structures fulfill the foregoing definitions with respect to the constituents of the ring structure, the preferred halogen and location of oxycarbonyls relative to halogen-substituted nitrogen.

Typically, geothermal brines contain substantial quantities (relative to the amount of arsenic present) of oxidizable sulfide, sulfite, and nitrite species. If all of these oxidizable species required a stoichiometric amount of oxidizer, the method of the present invention would not be very economical.

It was surprising to discover that the amount of oxidizing agent needed to oxidize all of the arsenic was only an extremely small percentage of the stoichiometric amount of oxidizing agent which theoretically was expected to be required for the arsenic and other oxidizable species in the brine. The stoichiometric equivalent of oxidant for oxidizing the arsenic in a $+3$ oxidation state to a plus $+5$ oxidation state would be determined by dividing two by the number of haloimine groups in the selected oxidizing agent. For example, for a Salton Sea geothermal brine, an effective amount was found to be within the range of from about 0.1 to about 0.5 percent of the theoretical stoichiometric amount required for all oxidizable species present in the brine. It is believed that the biocides of the present invention function in some manner as a catalyst; however, the invention should not be bound by any particular theory.

Preferably, the oxidizing agent is introduced into the brine in the cooling tower or the cooling tower catch basin in a substantially continuous manner. Other points of introduction and intermittent introduction, however, are considered to be within the scope of the invention.

Typically a geothermal brine will contain a sufficient amount of various metal, alkali metal and alkaline earth metal ions to react with the oxidized arsenic and form a desired water-insoluble precipitate. The same is not true for the steam condensate. Accordingly, it also is considered to be within the scope of the invention to add a selected metal to react with and cause precipitation of the arsenic in a stable, less toxic, water-insoluble form, preferably as an iron arsenate or calcium arsenate.

The amount of oxidizing agent used for arsenic oxidation is generally so small that it has substantially no biocidal effect. More particularly, the amount used is not sufficient to control or even substantially inhibit the growth of living organisms. To control the growth of living organisms in the brine handling system and maintain their population below a level which could create a problem, a biocide treatment is required. While the biocide may be the same previously named oxidizing agents, it is not necessarily preferred. While the named oxidizing agents appear to have a catalytic effect with respect to oxidation, the same is not true with respect to biocidal activity. Thus, the biocide generally will be selected on the basis of its cost effectiveness.

Preferred biocides are non-oxidizing biocides such as dodecylquanidine hydroclordie, isothiazalone and mixtures thereof. Generally the biocide is added in amounts of from about 25 to 200 ppmw relative to the condensate, at intervals of between about one week and about four weeks to periodically reduce the live organism count to an acceptably low level. The term "live organisms count" as used herein refers to the total number of living organisms such as algae, bacteria and fungi. As used herein the term "ppmw relative to the condensate" is to be understood to mean the concentration of added material in parts per million by weight relative to the total weight of condensate in the brine handling system.

Typically, the biocide is added to the condensate when the population level of live organisms reaches some predetermined level, for example, between about 1 million and about 10 million per liter of condensate. At such time, the biocide is preferably added to the condensate to reduce the population of live organisms to some predetermined lower limit, typically less than about 10,000 per liter.

EXAMPLE

This example is set forth to further illustrate the efficacy of the present invention as applied to a condensate of steam derived from a Salton Sea geothermal brine. The condensate is withdrawn from a condenser and introduced into a cooling tower at a rate of about 4.8 million pounds per day. The condensate contains about 0.5 ppm of arsenic in a $+3$ oxidation state (approximately 2.5 pounds per day of arsenic). An effluent stream (cooling tower blowdown) is withdrawn from the cooling tower at a rate of 350,000 pounds per day and is found to contain 19 ppm of arsenic equivalent to approximately 0.67 pounds per day. The remainder of the arsenic, approximately 1.83 pounds per day, is precipitated in the cooling tower as a result of air oxidation and reaction with calcium and piping corrosion products to form calcium arsenate and iron arsenate, respectively.

When an oxidizing biocide of the present invention (hydantoin) is introduced into the cooling tower at a rate of about 2 pounds per day (44% of the stoichiometric ratio required to react with all of the arsenic) a substantial increase in the amount of arsenic precipitation is observed. More particularly, the effluent from the cooling tower is found to contain less than about 1.2 ppm arsenic which is equivalent to about 0.042 pounds per day. Thus, 99% of the arsenic going into the cooling tower is precipitated as sludge by oxidation and reaction with metals contained in the condensate. The cooling tower effluent is sufficiently low in arsenic that it would not require disposal in a hazardous waste site. While it will be noted that, as above stated the oxidizing biocide was introduced in an amount of 44% of the stoichiometric amount for the arsenic, the condensate included a substantial quantity of other oxidizable species which also were oxidized. When the quantity of these other species, such as sulfites, bisulfites, nitrites, etc., are taken into consideration, it was determined that the amount of oxidizing biocide used was actually less than about 0.1% of the stoichiometric amount which theoretically would have been required.

An added advantage obtained by the present invention, as applied to solutions containing sulfides, sulfites, and nitrites as well as arsenic, is that emissions of gaseous oxides of sulfur and nitrogen are concurrently substantially reduced. For a more detailed description of this phenomena see co-pending U.S. applications Ser. Nos. 345,177 and 226,039 filed May 1, 1989 and July 29, 1988, respectively, assigned to the same assignee as this invention and the disclosures of which are incorporated herein by reference thereto.

There has been described above a preferred embodiment of the inventive method of oxidizing arsenic from a +3 to a +5 oxidation state and the optional precipitation of the arsenic in a stable, less toxic, water-insoluble form. The foregoing description of the present invention has been set forth for illustrative purposes only, and it will be appreciated that the scope of the invention is not limited thereto. Accordingly, many process modifications or variations may occur to those skilled in the art and still be within the scope of the invention as defined by the appended claims.

What is claimed is:

1. A method of treating an aqueous solution containing one or more arsenic compounds in a +3 oxidation state comprising, contacting the aqueous solution with an amount of an oxidizing agent to convert substantially all of the +3 oxidation state arsenic to a +5 oxidation state, said amount being substantially less than that which theoretically would be required to react with substantially all of the arsenic in the +3 oxidation state and any other oxidizable species in the aqueous solution, said oxidizing agent including at least one

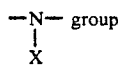

wherein X is a halogen.

2. The method of claim 1 wherein the oxidizing agent contains at least one

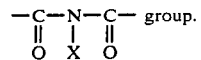

3. The method of claim 1 wherein the oxidizing agent contains at least one

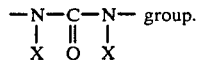

4. The method of claim 1 wherein the oxidizing agent contains at least one

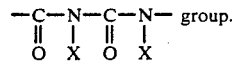

5. The method of claim 1 wherein the oxidizing agent consists of elements selected from the group consisting of nitrogen, hydrogen, carbon, oxygen, bromine and chlorine.

6. The method of claim 1 wherein each carbon atom substituted with an element selected from the group consisting of hydrogen, oxygen, chlorine, bromine and $C_1$-$C_6$ organic radicals.

7. The method of claim 6 wherein the oxidizing agent comprises a heterocyclic ring having from 5 to 6 atoms in one ring.

8. The method of claim 1 wherein said oxidizing agent has the general formula

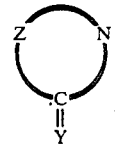

wherein X is a halogen, Y is oxygen or sulfur and Z is a divalent radical of from 3 to about 8 atoms in length.

9. The method of claim 8 wherein the ring structure consists of alternate carbon and nitrogen atoms.

10. The method of claim 1 wherein the amount of oxidizing agent is in the range of from about 0.01% to 10% of the theoretical stoichiometric amount required.

11. The method of claim 10 wherein the oxidizing agent is selected from the group consisting of trichloroisocyanuric acid and salts thereof, 1-bromo-3-chloro-5,5-dimethyl-hydantoin and salts thereof, and other halogenated substituted hydantoins, and mixtures thereof.

12. The method of claim 16 wherein the oxidizing agent is trichloroisocyanuric acid.

13. The method of claim 10 wherein the oxidizing agent is 1-bromo-3-chloro-5,5-dimethyl-hydantoin.

14. The method of claim 1 wherein the oxidized arsenic is reacted with a metal to form a precipitate less toxic than arsenic in a +3 oxidation state.

15. The method of claim 14 wherein the metal is selected from the group consisting of aluminum, iron and calcium for forming a substantially water-insoluble precipitate.

16. The method of claim 1 wherein at least part of the arsenic is present as arsenious acid and is oxidized to arsenic acid.

17. A method of treating an aqueous brine containing at least one water soluble from of arsenic in a +3 oxidation state said method comprising contacting said brine with a halogenated, organic, oxidizing biocide in an amount sufficient to oxidize the arsenic to a +5 oxidation state, said amount being less than the theoretical stoichiometric required for a direct oxidation reaction and said oxidizing agent including at least one $$-\underset{X}{N}-$$

wherein X is a halogen.

18. The method of claim 17 wherein the aqueous brine is a geothermal brine and further includes other oxidizable species selected from the group consisting of $H_2S$ and NO.

19. The method of claim 17 wherein the oxidizing agent contains at least one $$-\underset{\underset{O}{\|}}{C}-\underset{X}{N}-\underset{\underset{O}{\|}}{C}- \text{ group.}$$

20. The method of claim 18 wherein the oxidizing agent contains at least one $$-\underset{X}{N}-\underset{\underset{O}{\|}}{C}-\underset{X}{N}- \text{ group.}$$

21. The method of claim 18 wherein the oxidizing agent contains at least one $$-\underset{\underset{O}{\|}}{C}-\underset{X}{N}-\underset{\underset{O}{\|}}{C}-\underset{X}{N}- \text{ group.}$$

22. The method of claim 18 wherein the oxidizing agent consists of elements selected from the group consisting of nitrogen, hydrogen, carbon, oxygen, bromine and chlorine.

23. The method of claim 22 wherein each carbon atom is substituted with an element selected from the group consisting of hydrogen, oxygen, chlorine, bromine and $C_1$-$C_6$ organic radicals.

24. The method of claim 23 wherein the oxidizing agent comprises a heterocyclic ring having from 5 to 6 atoms in the ring.

25. The method of claim 18 wherein said oxidizing agent has the general formula:

$$\begin{array}{c} Z \frown N \\ \diagdown C \diagup \\ \| \\ Y \end{array}$$

wherein X is a halogen, Y is oxygen or sulfur and Z is a divalent radical of from 3 to about 8 atoms in length.

26. The method of claim 25 wherein the ring structure consists of alternate carbon and nitrogen atoms.

27. The method of claim 18 wherein the amount of oxidizing agent is in the range of from about 0.01% to 10% of the theoretical stoichiometric amount required.

28. The method of claim 1 wherein the oxidizing agent is selected from the group consisting of trichloroisocyanuric acid and salts thereof, 1-bromo-3-chloro-5,5-dimethyl-hydantoin and salts thereof, and halogenated substituted hydantoins and their salts.

29. The method of claim 18 wherein the oxidizing agent is trichloroisocyanuric acid.

30. The method of claim 18 wherein the oxidizing agent is selected from the group consisting of 1-bromo-3-chloro-5,5-dimethyl-hydantoin and salts thereof, and other halogenated substituted hydantoins, and mixtures thereof.

31. The method of claim 18 wherein the oxidized arsenic is reacted with a metal to form a precipitate less toxic than arsenic in a +3 oxidation state.

32. The method of claim 31 wherein the metal is selected from the group consisting of aluminum, iron and calcium for forming a substantially water-insoluble precipitate.

33. The method of claim 32 wherein the arsenic is present as arsenious acid and is oxidized to arsenic acid.

34. For a process in which a flow of steam containing arsenic in a +3 oxidation state and other oxidizable compounds, derived from a geothermal fluid, is used to generate electric power and which includes (a) at least one steam turbine, (b) at least one steam condenser downstream of the turbine in which at least some of the steam is condensed to steam condensate and from which noncondensible gases are discharged, and (c) at least one cooling tower for cooling the condensate, the cooling tower being open to the atmosphere and having associated therewith a condensate catch basin, condensate from the condenser containing oxidizable species including arsenic in a +3 oxidation state and at least one oxidizable species selected from the group consisting of $H_2S$ and NO, and a sludge formed in the condensate comprising atmospheric blown particles and living organisms, a method of treating the condensate and sludge to convert the arsenic in a +3 oxidation state to a water-insoluble precipitate suitable for disposal in a non-hazardous waste disposal site, said method comprising: contacting the condensate and sludge with an effective amount of an oxidizing agent to oxidize substantially all of the arsenic to a +5 oxidation state in the presence of a metal selected from the group consisting of aluminum, iron and calcium to produce a stable, substantially water-insoluble compound of arsenic and said selected element, the amount of oxidizing agent being substantially less than the stoichiometric amount theoretically required to react with all of the arsenic and the other oxidizable species in the brine, said oxidizing agents including at least one $$-\underset{X}{N}- \text{ group,}$$

wherein X is a halogen.

35. The method of claim 34 wherein the oxidizing agent contains at least one $$-\underset{\underset{O}{\|}}{C}-\underset{X}{N}-\underset{\underset{O}{\|}}{C}-\underset{X}{N}- \text{ group.}$$

36. The method of claim 35 wherein the oxidizing agent consists of elements selected form the group consisting of nitrogen, hydrogen, carbon, oxygen, bromine and chlorine.

37. The method of claim 36 wherein each carbon atom is substituted with an element selected from the group consisting of hydrogen, oxygen, chlorine, bromine and $C_1$–$C_6$ organic radicals.

38. The method of claim 37 wherein the oxidizing agent comprises a heterocyclic ring having from 5 to 6 atoms in the ring.

39. The method of claim 34 wherein said oxidizing agent has the general formula:

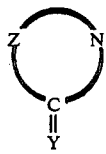

wherein X is a halogen, Y is oxygen or sulfur and Z is a divalent radical of from 3 to about 8 atoms in length.

40. The method of claim 39 wherein the ring structure consists of alternate carbon and nitrogen atoms.

41. The method of claim 25 wherein Z is 3 to 4 atoms in length.

42. The method of claim 34 wherein the amount of oxidizing agent is in the range of from about 0.01% to 10% of the theoretical stoichiometric amount required.

43. The method of claim 42 wherein the oxidizing agent is selected from the group consisting of trichloroisocyanuric acid and salts thereof, 1-bromo-3-chloro-5,5-dimethyl-hydantoin and salts thereof, and other halogenated substituted hydantoins, and mixtures thereof.

44. The method of claim 42 wherein the oxidizing agent is trichloroisocyanuric acid.

45. The method of claim 42 wherein the oxidizing agent is 1-bromo-3-chloro-5,5-dimethyl-hydantoin and salts thereof, and other halogenated substituted hydantoins, and mixtures thereof.

46. The method of claim 34 wherein at least part of the arsenic is present as arsenious acid and is oxidized to arsenic acid.

47. The method of claim 45 wherein the amount of oxidizing agent is less than 10% of the theoretical stoichiometric amount required.

48. The method of claim 46 wherein the condensate and sludge are contacted with a biocide in an amount sufficient to control the population growth of living organisms.

49. The method of claim 47 wherein the sludge and condensate are periodically contacted with the biocide.

50. The method of claim 48 wherein the biocide is a non-oxidizing biocide.

* * * * *

UNITED STATES PATENT AND TRADEMARK OFFICE
CERTIFICATE OF CORRECTION

PATENT NO. : 5,024,769

DATED : June 18, 1991

INVENTOR(S) : Darrell L. Gallup

It is certified that error appears in the above-identified patent and that said Letters Patent is hereby corrected as shown below:

Claim 8, column 8, lines 35-40, delete

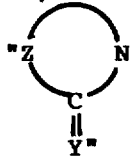   and insert therefor   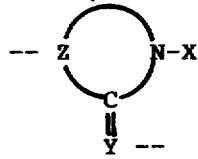

Claim 17, column 9, line 2, delete "from" and insert therefor -- form --, line 7, after "reaction" insert therefor -- , --.

Claim 19, column 9, line 1, delete "17" and insert therefor -- 18 --.

Claim 25, column 9, lines 54-58, delete

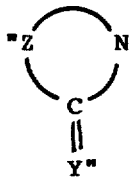   and insert therefor   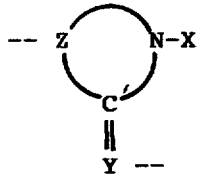

Claim 17, column 9, line 4, delete "biocide" and insert therefor -- agent --, line 7, after "stoichiometric" insert therefor -- amount --.

Signed and Sealed this

Fifteenth Day of December, 1992

*Attest:*

DOUGLAS B. COMER

*Attesting Officer*   Acting Commissioner of Patents and Trademarks